United States Patent [19]
Stephenson, III et al.

[11] Patent Number: 5,506,650
[45] Date of Patent: Apr. 9, 1996

[54] CAMERA DOOR ACTUATED CARTRIDGE EXTRACTOR

[75] Inventors: Stanley W. Stephenson, III, Spencerport; Tom Seamans, Corfu, both of N.Y.

[73] Assignee: Eastman Kodak Company, Rochester, N.Y.

[21] Appl. No.: 412,410

[22] Filed: Mar. 28, 1995

[51] Int. Cl.$^6$ ............................ G03B 17/02; G03B 17/26
[52] U.S. Cl. ............................................ 354/275; 354/288
[58] Field of Search ................................. 354/275, 288, 354/174; 242/339

[56] References Cited

U.S. PATENT DOCUMENTS

| | | |
|---|---|---|
| 2,548,549 | 4/1951 | Mihalyi . |
| 3,380,362 | 4/1968 | Winkler et al. . |
| 3,543,664 | 12/1970 | Kremp et al. . |
| 3,672,279 | 6/1972 | Hackenberg et al. . |
| 4,095,249 | 6/1978 | Miura . |
| 4,240,734 | 12/1980 | Nomura et al. . |
| 4,330,190 | 5/1982 | Chan . |
| 4,841,319 | 6/1989 | Hansen ................................. 354/275 |
| 5,049,914 | 9/1991 | Dassero . |
| 5,231,438 | 7/1993 | Smart . |
| 5,323,201 | 6/1994 | Richiuso et al. . |
| 5,394,213 | 2/1995 | Hazama et al. ....................... 354/288 |
| 5,418,587 | 5/1995 | Dirisio .................................. 354/288 |
| 5,430,515 | 6/1995 | Lawther et al. ...................... 354/275 |
| 5,432,573 | 7/1995 | Lawther et al. ...................... 354/275 |

Primary Examiner—A. A. Mathews
Attorney, Agent, or Firm—Peter J. Bilinski

[57] ABSTRACT

A camera door actuated cartridge extractor includes a rod which is pivotally mounted to the cartridge chamber closing camera door at a point between the camera door pivot and the adjacent wall of the cartridge chamber so that initial opening of the camera door provides a relatively large extracting motion that quickly disconnects the cartridge from the driver. Thus, manual movement of the driver by the camera operator is less likely to move film within the cartridge after a film enclosing cartridge door is closed. A spring may be provided biasing the camera door to a partially open position to accelerate disconnection of the cartridge from the driver. Placement of the extractor rod in a slot between adjacent battery pockets provides a compact arrangement. Engagement of a hook-like keeper portion of the extractor rod with a rib on the door provides a friction force for maintaining the door in a fully open position until closing is desired.

7 Claims, 4 Drawing Sheets

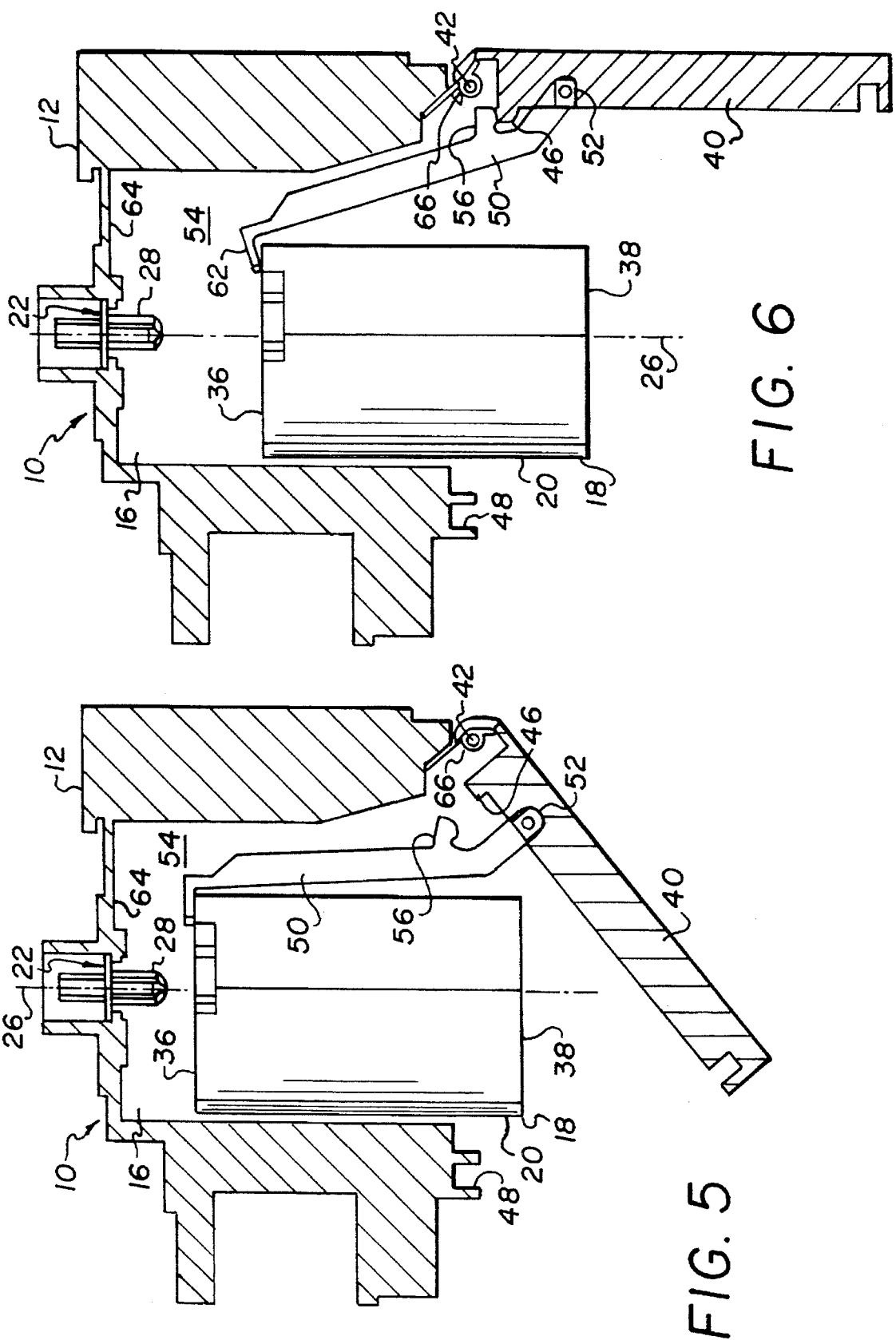

5,506,650

CAMERA DOOR ACTUATED CARTRIDGE EXTRACTOR

FIELD OF THE INVENTION

This invention relates to photographic cameras with replaceable film cartridges and more particularly to cartridge extractor mechanisms for manual film advance cameras having axially removable cartridges.

BACKGROUND OF THE INVENTION

It is known in the art relating to photographic cameras to utilize end loaded film cartridges having light sealing doors to prevent exposure of the film when the cartridge is exposed to light. When a cartridge is loaded into a chamber in the camera, an outer door on the camera is closed to prevent the entry of light into the film chamber. A mechanism within the camera prevents opening of the light sealing door on the cartridge until the outer door on the camera is latched in the closed position. Such a mechanism is shown in U.S. Pat. No. 5,231,438 issued Jul. 27, 1993 to the assignee of the present invention. Thereafter the film may be advanced out of the cartridge through the open light sealing door and into position in the camera for normal use in retaining photographic images.

After exposure, the film is rewound into the cartridge and the outer camera door is unlatched. This action causes closing of the cartridge light sealing door to prevent exposure of the film when the outer door is opened. If by accident or otherwise, the operator turns the knob which advances the film when the outer camera door has been unlatched but the cartridge is still connected with the knob driver, the film will be forced against the closed cartridge door jamming the film and cartridge.

Previous arrangements have been proposed for extracting end loaded cartridges from a camera film chamber in connection with the opening of the camera outer door. However, a suitable mechanism is desired which reduces the risk of jamming the film by attempting its advancement after the camera door has been unlatched.

SUMMARY OF THE INVENTION

The present invention provides a camera door actuated cartridge extractor which helps prevent film jamming and provides other advantages. In a preferred embodiment the extractor comprises a rod connected with the camera outer door in a way that causes greater extracting motion of the cartridge during initial opening of the door so that the cartridge is quickly disconnected from the driver that moves the film. The remaining extracting motion of the extractor upon opening the door to its fully open position involves movement at a slower rate, but the possibility of film jamming during this portion of the door movement is avoided by early separation of the cartridge from the driver. Optionally the door or extractor mechanism may be provided with a spring that urges the door to an opening position sufficiently great to disengage the driver when the door latch is disengaged. Thus, the door is quickly opened to the position where film jamming is avoided upon unlatching of the film outer door and concurrent closing of the cartridge light sealing door.

These and other features and advantages of the invention will be more fully understood from the following detailed description of the invention taken together with the accompanying drawings.

BRIEF DESCRIPTION OF THE DRAWINGS

In the drawings:

FIG. 5 is a view similar to FIGS. 3 and 4 but with the outer door in a more fully open position; and FIG. 6 is a view similar to FIGS. 3-5 with the outer door in the fully open position.

DETAILED DESCRIPTION OF THE INVENTION

Figure 1:
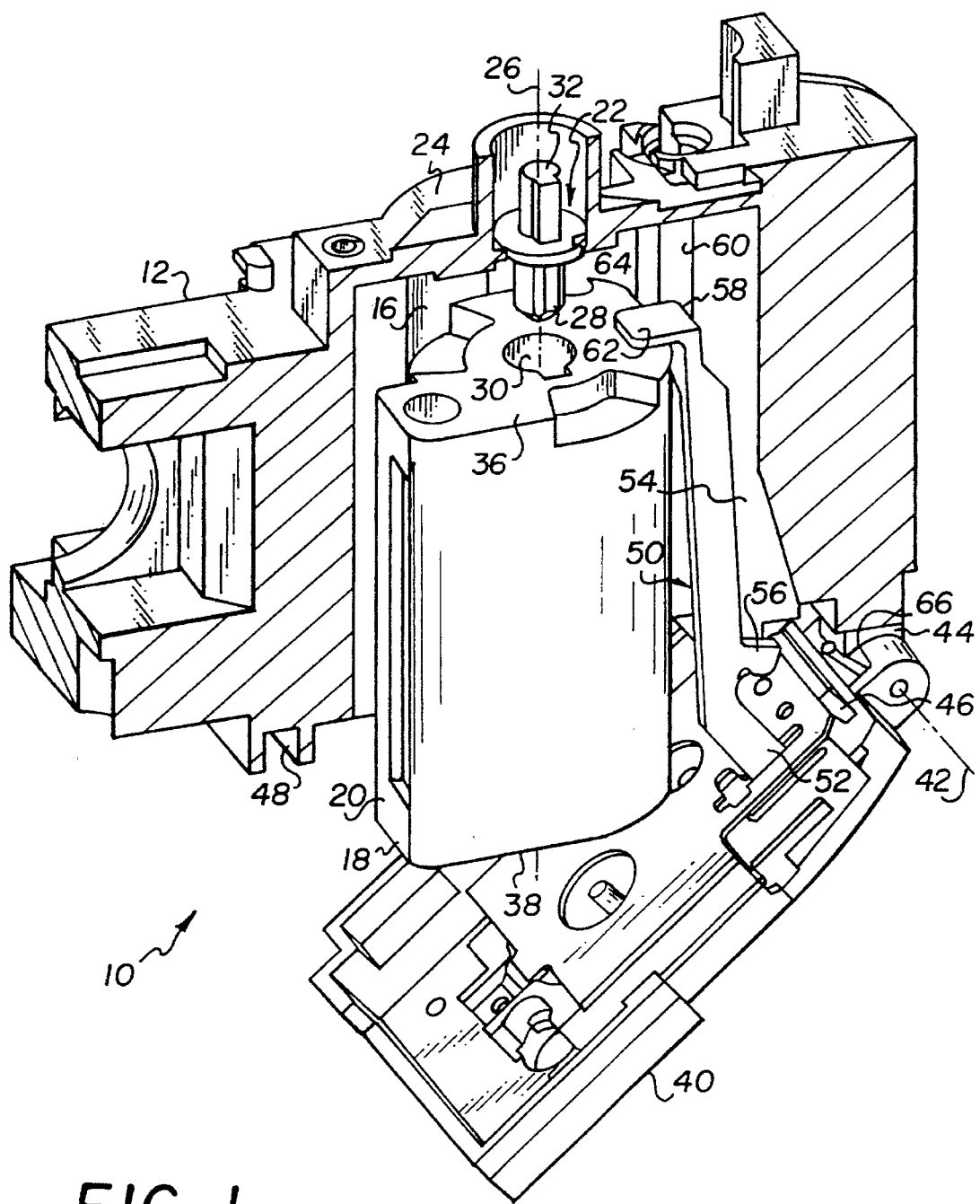
FIG. 1 is a fragmentary cross-sectional pictorial view showing the cartridge end of a manual film advance camera having a cartridge extractor according to the invention.
Figure 2:
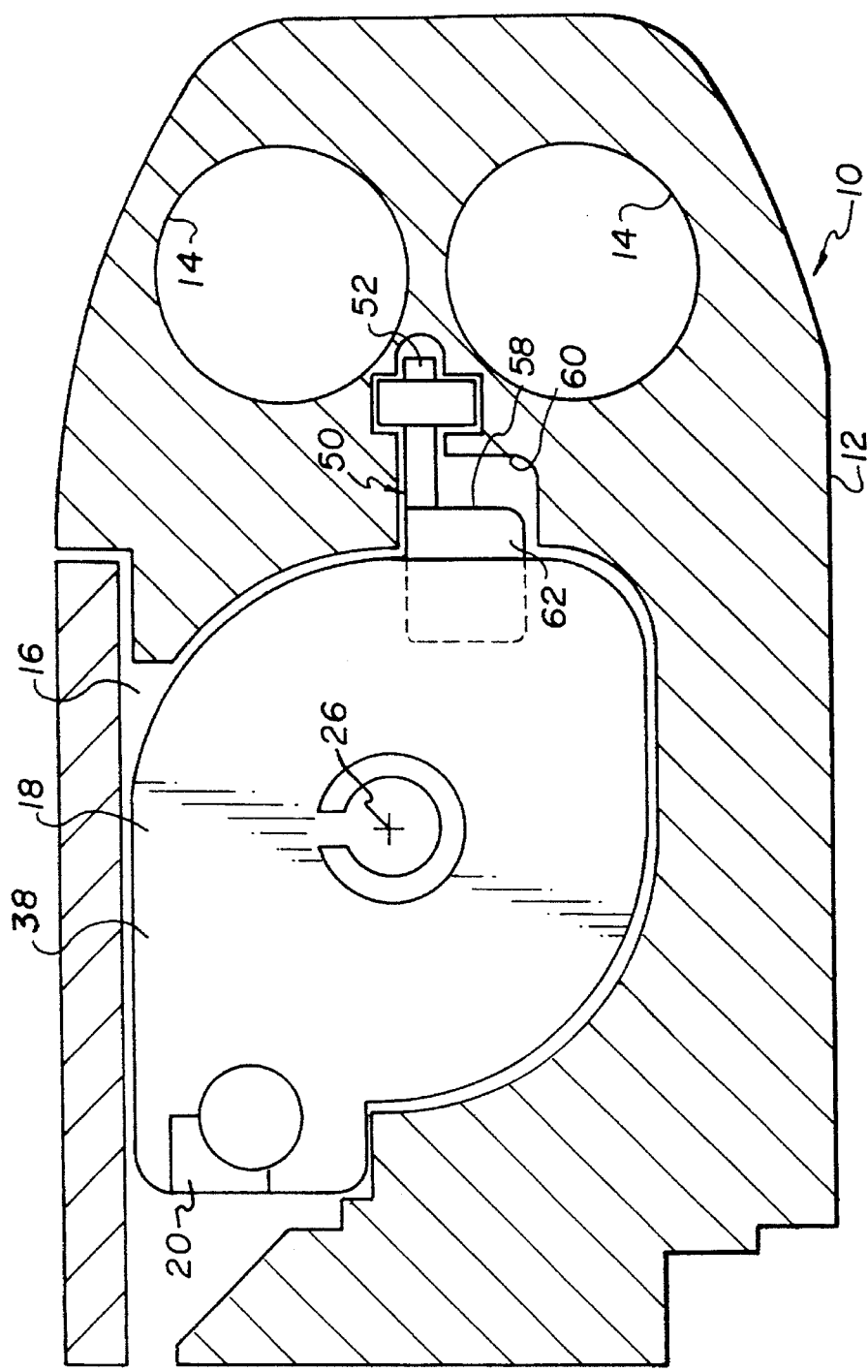
FIG. 2 is a schematic cross-sectional view from the lower end of the camera portion of FIG. 1 illustrating the position of internal components.

Referring now to the drawings in detail, numeral 10 generally indicates a manual film advance still camera, only the right hand portion of which is shown. Camera 10 includes a body 12, shown in cross-section in FIGS. 1 and 3-5. Near the right hand end of the body, spaced cylindrical pockets 14 are provided for receiving cylindrical batteries as shown in FIG. 2.

Inwardly adjacent to the location of the battery pockets 14, the camera body defines a film chamber 16 which is closed at the upper end and open at the lower end for receiving therein a film cartridge 18. The film cartridge is of the type having a light sealing door, not shown, located at the film opening end 20 of the cartridge. A driver 22 is rotatably mounted in an upper wall 24 at the end of the chamber 16 and is rotatable on an axis 26 which extends centrally of and vertically through the chamber 16. Driver 22 has a keyhole shaped inner end 28 that engages a mating coupling 30 in the inner end of the cartridge 18 for advancing and rewinding the film in normal camera operation. The driver 22 also has a keyhole shaped outer end 32 which is adapted for connection to a driving knob, not shown, of conventional construction for advancing and rewinding the film.

The cartridge 18 is end loaded into the chamber 16 along the axis 26, which also defines the axis of film rotation on a spool, not shown, within the cartridge. Coupling 30 is recessed within an inner end 36 of the cartridge which, when fully inserted into the chamber, engages the upper wall 24 of the body 12.

Figures 3, 4:
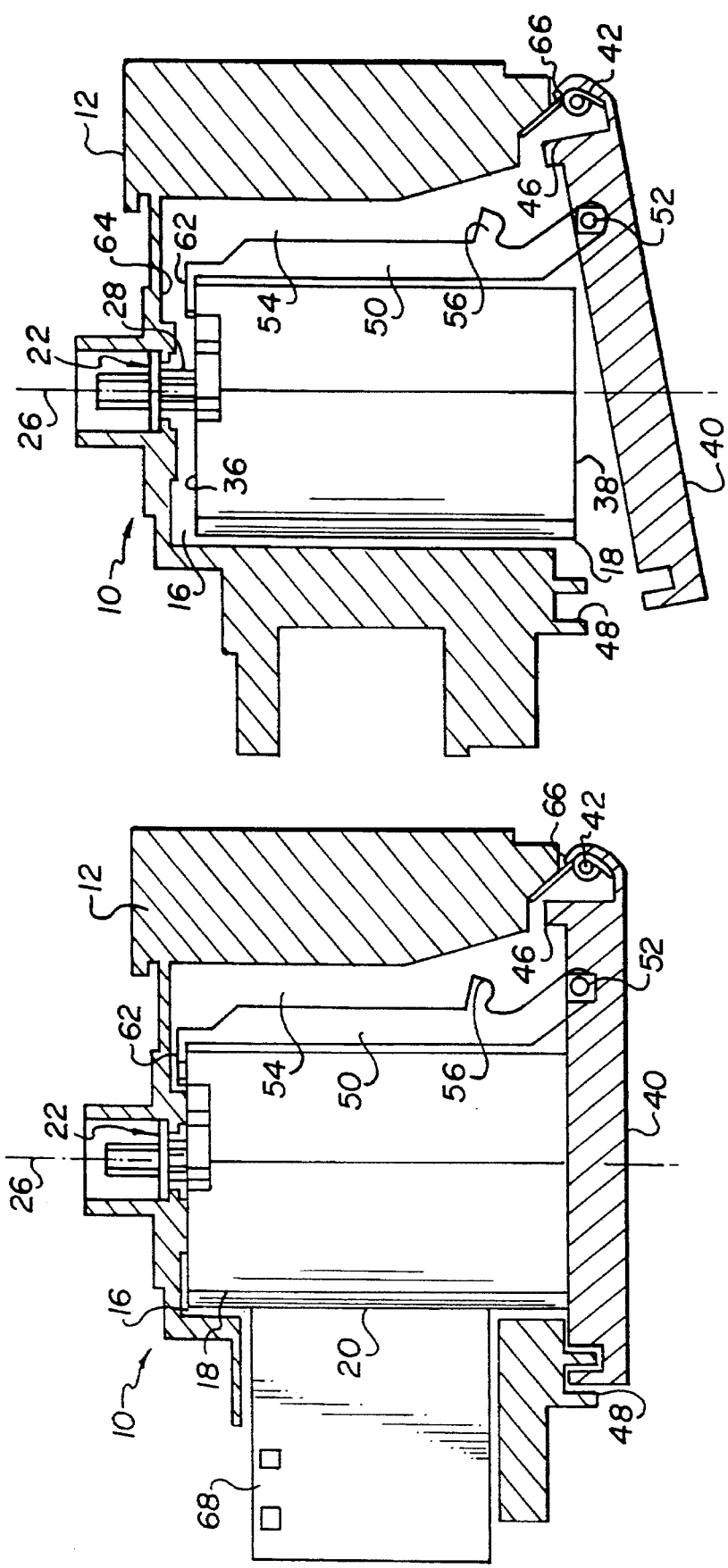
FIG. 3 is a fragmentary cross-sectional view of the camera with the outer door in the closed position.
FIG. 4 is a view similar to FIG. 3 but with the outer door in a partially open position sufficient to disengage the film driver.

At its outer end 38, the cartridge is normally enclosed by a camera outer door 40 that closes the end of the chamber 16 during normal camera operation. Door 40 is pivotally mounted on an axis 42, such as by a pivot pin connection to a post member 44. The post member extends downward from the right side of the body, preferably outward of the location of the pockets 14 and generally between them. The door 40 includes an upwardly projecting rib 46 extending at least part way around its periphery and coacting with a recess or other means on the body 12 to provide a light blocking seal when the door 40 is fully closed, as shown in FIG. 3.

In order to provide for the easy extraction of a film cartridge from the body chamber 16, an extracting mechanism is provided which includes an extractor rod 50 having an outer end 52 pivotally connected to the outer door 40. The main portion of the rod 50 has a generally flattened body extending in part through a groove 54 that lies partially between the battery pockets 14 and opens on its side to the interior of the chamber 16. A hook-like keeper 56, extending outward from the main portion of the rod 50, is configured to engage the rib 46 of the outer door 40 when the door is in its fully open position as shown in FIG. 6. The frictional engagement of the keeper 56 with the rib 46 tends to maintain the door 40 in its fully open position until it is intentionally closed by the operator.

At its end opposite the pivot connection with the door 40, the extractor rod 50 is provided with a guide portion 58 which extends into the chamber 16 and laterally from the flattened body of the rod 50 to engage an outer wall 60 of the chamber. Adjacent the guide portion is a lip 62 protruding inward into the chamber 16 so as to engage the inner end 36 of a cartridge 18 received within the chamber. A depression 64 in the inner end of the chamber 16 receives the lip 62 when the door is closed as in FIG. 3 so as to allow the cartridge 18 to engage the upper wall 24.

Optionally, the extracting mechanism further includes a spring 66 biasing the door into at least a partially open condition, as will subsequently be described. Spring 66 may take any suitable form but, in the illustrated embodiment, is shown as a torsion spring mounted around the door pivot axis 42 and engaging adjacent edges of the camera body and the camera outer door 40. Any other suitable spring arrangement which biases the door outward when near its closed position could be used if desired.

In use as shown in FIGS. 3–6, the normal operating condition of the camera is shown in FIG. 3 wherein the outer door 40 is closed. In this condition, the film cartridge 18 is fully enclosed within the chamber 16 and the camera film 68 is shown extending out of the cartridge opening into an operating position within the camera. A latch mechanism, not shown, prevents opening of the outer door 40 whenever the film is extended from the cartridge 18 as shown in FIG. 3.

When the film is fully exposed, the operator rewinds the film fully into the cartridge by manually actuating the driver 22 with the driving knob, not shown. When the film is fully received within the cartridge, the door latch mechanism, not shown, is released which internally closes the light sealing door in the film opening end 20 of the cartridge 18 and thereafter allows opening of the camera outer door 40 to remove the cartridge. At this point, prior to opening of the outer door 40, if the camera operator intentionally or accidentally rotates the driving knob to turn the driver 22 in a direction that would attempt to force the film out of the cartridge, the film will be forced against the cartridge door, jamming the film and the cartridge. To avoid this, it is desirable that the outer door of the camera be opened promptly after unlatching and that the opening motion be such as to quickly move the cartridge sufficiently far in an extracting direction to disconnect the coupling 30 from the inner end 28 of the driver 22. This is accomplished in the disclosed embodiment by the following features.

The pivotal mounting of the extractor rod 50 to the door 40 is located at a point between the pivot axis 42 of the door and the adjacent outer wall 60 of the chamber 16 in which the cartridge 18 is located. Also, the door 40 is positioned, when closed, to be essentially normal, or at right angles, to the axis 26 of the chamber and its associated cartridge. The result of this is that when the outer door 40 is opened slightly from the closed position shown in FIG. 3 to the slightly open position shown in FIG. 4, the engagement of lip 62 with the inner end 36 of the cartridge moves the cartridge outward at a relatively rapid rate to the point in FIG. 4 where the coupling 30 is disconnected from the driver 22. Thereafter, rotation of the driver by the camera operator has no effect upon the film within the cartridge. The positioning of the pivot connection of rod 50 with the door 40 is such that the initially extracting motion of the rod 50 during pivotal motion of the door is greater during the initial phase of door opening and lessens as the door pivots further toward a fully open position. This results in disconnection of the cartridge from the driver with the relatively small amount of door opening illustrated in FIG. 4.

A second feature which may help to avoid the film jamming situation is the use of the spring 66 which, upon releasing of the outer door latch and consequent closing of the film cartridge light sealing door, immediately urges the outer door 40 from the closed position into the partially open position shown in FIG. 4. In this way, the film cartridge 18 is quickly disconnected from the driver 22 and the possibility of manual action by the operator causing jamming of the film is avoided.

FIG. 5 illustrates operation of the extractor mechanism as the door 40 is opened more fully to a partially open position. It shows that the lip 62 engaging the inner end 36 of the cartridge continues to pull the cartridge 18 outward in an extracting motion as the door is opened further.

In FIG. 6 it is apparent that when the door 40 is fully opened, the cartridge is moved sufficiently far to be grasped by the fingers of the operator for complete removal. At the same time, the keeper 56 portion of the extractor rod engages the rib 46 of the door to frictionally hold the door in the fully open position until closing of the door by the operator is accomplished. This will usually occur after another cartridge has been placed within the chamber 16. When the inner end 36 of the new cartridge engages the lip 62 of the extractor rod 50, motion of the cartridge 18 into the chamber will tend to close the outer door 40, an action that will be completed by the operator moving the door to the closed position shown in FIG. 3, after which latching will allow the camera film 68 to be advanced in the normal manner for operation of the camera.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

| Parts List | |
|---|---|
| 10. camera | 40. outer door |
| 12. body | 42. axis |
| 14. pockets | 44. post member |
| 16. film chamber | 46. rib |
| 18. film cartridge | 48. recess |
| 20. opening end | 50. extractor rod |
| 22. driver | 52. outer end |
| 24. upper wall | 54. groove |
| 26. axis | 56. keeper |
| 28. inner end (driver) | 58. guide portion |
| 30. coupling | 60. outer wall |
| 32. outer end (driver) | 62. lip |
| 36. inner end cartridge) | 64. depression |
| | 66. spring |
| 38. outer end | 68. film |

| Parts List |
| --- |
| (cartridge) |

What is claimed is:

1. A photographic camera having a chamber for receiving an end loaded film cartridge along a cartridge axis, a pivotally mounted door covering an entrance to said chamber when closed and openable to uncover the entrance, extracting mechanism connected with the door for pulling the film cartridge axially at least part way out of the chamber when the door is opened, the camera being characterized in that:

said door pivots about a pivot axis spaced laterally a substantial distance to one side of the chamber entrance; and the extracting mechanism includes an extractor rod having one end pivotally connected to the door at a location between the cartridge and the pivot axis, said rod having an opposite end including a lateral protrusion engageable with an inner end of the cartridge upon initial opening of the door;

whereby upon opening of the door, the rod extracts the cartridge at least partially from the chamber, the extracting motion of the rod during pivotal motion of the door being greater during the initial phase of door opening and lessening as the door pivots toward a fully open position.

2. A camera as in claim 1 characterized by a driver mounted in the camera for rotation on the cartridge axis, the driver engaging a coupling on the cartridge when installed for moving film in the cartridge, the greater motion of the rod during initial opening of the door acting to quickly disengage the driver from the cartridge coupling and thereby reduce the possibility of undesired film movement during door opening motion.

3. A camera as in claim 2 characterized in that the extracting mechanism further includes a spring biasing the door in an opening direction when closed, said spring acting to open the door when unlatched at least far enough to disengage the driver from the cartridge, thus aiding the quick disengagement thereof.

4. A camera as in claim 1 characterized in that said rod includes a keeper protruding laterally from the rod near its connection with the door, said keeper engaging a rib on the door when fully open to maintain the fully open door position.

5. A camera as in claim 1 characterized by a pair of battery pockets positioned outward of the cartridge chamber, said rod lying in a slot extending between said pockets.

6. A camera as in claim 1 characterized by a guide portion on the rod and extending into the chamber and sideward from the slot, said portion slidably engaging a wall of said chamber adjacent the slot to guide motion of said cartridge engaging lateral protrusion along said wall.

7. A camera as in claim 1 characterized in that said protrusion is configured as a lip.

* * * * *